(12) United States Patent
Debendra

(10) Patent No.: US 9,317,466 B2
(45) Date of Patent: *Apr. 19, 2016

(54) COMPLETION COMBINING TO IMPROVE EFFECTIVE LINK BANDWIDTH BY DISPOSING AT END OF TWO-END LINK A MATCHING ENGINE FOR OUTSTANDING NON-POSTED TRANSACTIONS

(71) Applicant: INTEL CORPORATION, Santa Clara, CA (US)

(72) Inventor: Das Sharma Debendra, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/564,988

(22) Filed: Dec. 9, 2014

(65) Prior Publication Data

US 2015/0095544 A1    Apr. 2, 2015

Related U.S. Application Data

(63) Continuation of application No. 13/843,611, filed on Mar. 15, 2013, now Pat. No. 8,935,453.

(51) Int. Cl.
| | |
|---|---|
| *G06F 13/20* | (2006.01) |
| *G06F 13/38* | (2006.01) |
| *G06F 13/40* | (2006.01) |
| *G06F 11/30* | (2006.01) |
| *H04L 12/891* | (2013.01) |
| *G06F 13/42* | (2006.01) |

(52) U.S. Cl.
CPC ........ *G06F 13/4022* (2013.01); *G06F 11/3041* (2013.01); *G06F 13/4282* (2013.01); *H04L 47/41* (2013.01); *G06F 2213/0026* (2013.01); *Y02B 60/33* (2013.01)

(58) Field of Classification Search
CPC ............ G06F 13/4022; G06F 13/4282; G06F 2213/0026
USPC ........................ 710/16–19, 300, 313; 370/229
See application file for complete search history.

(56) References Cited

U.S. PATENT DOCUMENTS

| | | | |
|---|---|---|---|
| 7,953,074 B2 * | 5/2011 | Pettey et al. | 370/362 |
| 8,174,969 B1 * | 5/2012 | Kommidi et al. | 370/229 |
| 8,539,134 B2 * | 9/2013 | Bacher et al. | 710/313 |
| 2003/0235197 A1 | 12/2003 | Wentink | |

FOREIGN PATENT DOCUMENTS

| | | |
|---|---|---|
| EP | 1 104 141 A2 | 5/2001 |
| EP | 1 104 141 A3 | 1/2004 |

OTHER PUBLICATIONS

Extended European Search Report received for European Patent Application No. 14158735.2, mailed on Nov. 11, 2014, 7 pages.
Wilen, et al., "Introduction to PCI Express—Transaction Layer Architecture", Chapter 6, XP002731540, Dec. 30, 2003, 27 pages.

* cited by examiner

*Primary Examiner* — Tammara Peyton
(74) *Attorney, Agent, or Firm* — Carrie A. Boone, P.C.

(57) ABSTRACT

An apparatus and method are disclosed in which unrelated completion operations intended for a single destination (requestor) are coalesced to improve achievable data bandwidth. During transmission, the completion operations are collected and compressed into a single packet and transmitted along the link. At a receiving end of the link, the single packet is decompressed and the previously unrelated packets are returned to their initial state before receipt by the requestor. The method can be implemented in the root complex, end points, and/or switches, in the case of a PCIe implementation, but can also be applied to other protocols besides PCIe.

20 Claims, 11 Drawing Sheets

COMPLETION COMBINING TO IMPROVE EFFECTIVE LINK BANDWIDTH BY DISPOSING AT END OF TWO-END LINK A MATCHING ENGINE FOR OUTSTANDING NON-POSTED TRANSACTIONS

CROSS-REFERENCE TO RELATED APPLICATIONS

This application is a continuation of U.S. Pat. No. 8,935,453 issued on Jan. 13, 2015.

TECHNICAL FIELD

This application relates to packet processing.

BACKGROUND

In serial links, each packet has an overhead associated with it. Completion transactions in PCIe have an overhead of five double words (DWs): one DW for framing, three DWs for the header, and one DW dedicated to the cyclic redundancy check (CRC). This overhead is present irrespective of the data payload the transaction contains. (PCIe is short for peripheral component interconnect express, and is a high-speed serial bus standard used by many computer systems.)

For example, if the read requests are for 32 bytes (32B), then the corresponding completions contain eight double words (DWs) (32 bytes) of data, resulting in an efficiency of 61.5% (8 DWs out of 13 DWs). Thus, in an x16 third generation PCIe link, one can achieve a data bandwidth of 9.84 gigabytes per second (GB/s) instead of the 16 GB/s available using a 32B request size. If the request size is 64B, the bandwidth efficiency increases to 76.2%. If the request size increases to 256B, the efficiency increases to 93%.

A lot of bandwidth-sensitive applications, such as graphics and high-performance computing (HPC) networking, have small request sizes. That inherently limits the amount of bandwidth achievable due to the protocol overheads discussed above. One solution is to overprovision at width and/or frequency levels, which is expensive from a cost as well as power point of view.

Thus, there is a continuing need for a solution that addresses the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, an apparatus and method are disclosed in which unrelated completion operations intended for a single destination (requestor) are coalesced to improve achievable data bandwidth. During transmission, the completion operations are collected and compressed into a single packet and transmitted along the link. At a receiving end of the link, the single packet is decompressed and the previously unrelated packets are returned to their initial state before receipt by the requestor. The method can be implemented in the root complex, end points, and/or switches, in the case of a PCIe implementation, but can also be applied to other protocols besides PCIe.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

Figure 1:
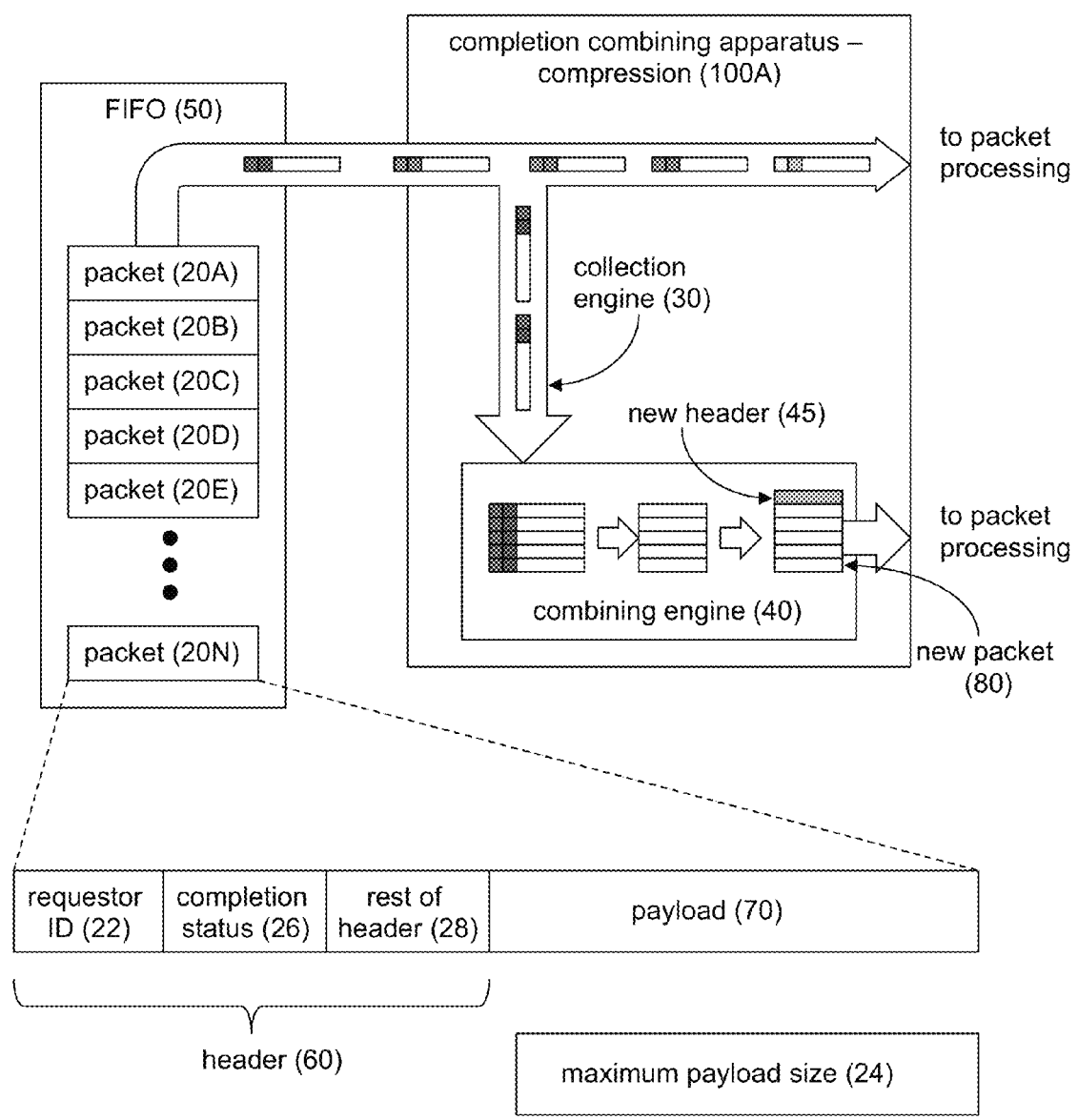
FIG. 1 is a simplified block diagram of a completion combining apparatus, featuring the compression portion, according to some embodiments.
Figure 2:
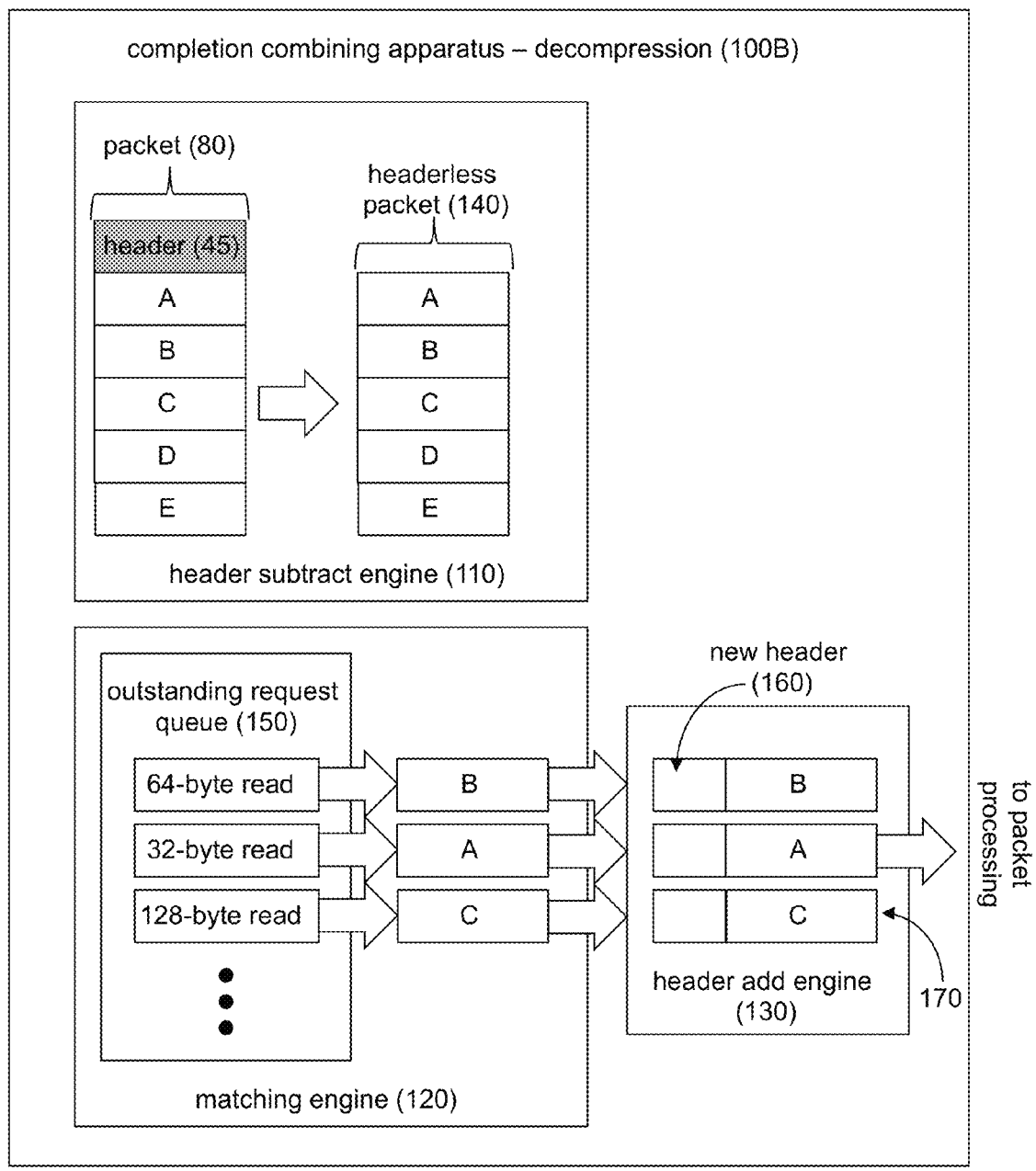
FIG. 2 is a simplified block diagram of a completion combining apparatus, featuring the decompression portion, according to some embodiments.

FIGS. 1 and 2 are simplified diagrams of a completion combining apparatus, according to some embodiments. The completion combining apparatus may be part of a processor-based system, a system-on-chip, a server system, or any of a variety of other processor-based systems. Some example systems are illustrated in this disclosure, below. For now, in describing the apparatus 100, the operational environment is merely called "the system".

The completion combining apparatus has two distinct functions: to combine packets for more efficient transmission through the system and to disassemble the combined packets at some reception point, thus restoring the packets to their original form. Accordingly, the apparatus 100 is described in two parts: compression apparatus 100A and decompression apparatus 100B (collectively, "completion combining apparatus 100"). On the compression side 100A, which, in some embodiments, occurs at the transmitter portion of the link, the apparatus includes a collection engine 30 and a combining engine 40, while, on the decompression side 100B, which, in some embodiments, occurs at the receiver portion of the link, the apparatus includes a header subtract engine 110, a matching engine 120, and a header add engine 130. While the operations of FIGS. 1 and 2 are referred to as "compression"

and "decompression", the operations may also be thought of as combining and uncombining, assembling and disassembling, joining and unjoining, coalescing and uncoalescing, and so on. The terms, "compression" and "decompression", as used herein, are meant to convey broad meaning and are not meant to imply operations other than those that are disclosed and illustrated herein.

Although these two parts 100A and 100B appear distinct from one another, the system in which they reside does not benefit unless both parts, 100A and 100B, are present. Thus, rather than separate entities, the compression apparatus 100A and the decompression apparatus 100B may be thought of as two parts of a whole apparatus 100. On the other hand, the compression apparatus 100A may reside on a transmitter while the decompression apparatus 100B resides on a separate receiver. In such a configuration, the "system", as described herein, is meant to encompass both the transmitter and the receiver.

On the compression side 100A, the apparatus is connected to a memory buffer of some sort, such as a first-in-first-out (FIFO) 50. The FIFO 50 stores packets 20A, 20B, ..., 20N (collectively, "packets 20") which have been processed elsewhere in the system. Each packet 20 includes a header 60 and a payload 70. The header 60 further includes at least a requestor identifier (RID) 22 and a completion status field 26, as well as the remainder of the header 28, the contents of which is unimportant for operation of the apparatus 100.

During normal operation of the system, packets 20 flow out of the FIFO to a packet processing entity. Where the apparatus 100 is present in the system, however, the packet flow is monitored by the collection engine 30, in some embodiments. The collection engine 30 observes the packets 20 flowing out of the FIFO to the packet processing, and, based on the header characteristics of each packet, removes some packets from the flow for further processing, in some embodiments.

Figure 3:
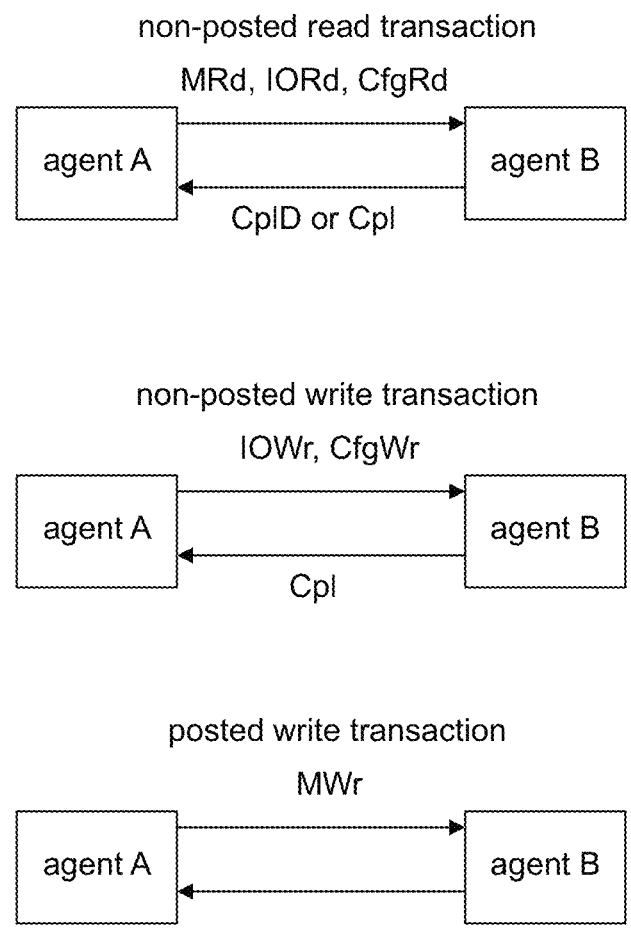
FIG. 3 is a simplified block diagram non-posted and posted operation that take place under the PCIe standard, according to some embodiments.

In some embodiments, the completion combining apparatus 100 attends to completion operations. Completion operations are those operations that follow non-posted operations. FIG. 3 is a simplified block diagram showing some non-posted operations, as well as a posted operation, that take place under the PCIe standard.

First, a non-posted read transaction may include a memory read (MRd), an I/O read (IORd), or a configuration read (CfgRd). Agent A issues the MRd, IORd, or CfgRd command, along with the address of agent B that Agent A requests. Agent B sends a completion command with the expected data (CpID), unless the transaction not successful, in which case agent B sends an error completion command (Cpl). A non-posted read transaction thus takes place between agents A and B.

A non-posted write transaction may include an I/O write (IOWr) or a configuration write (CfgWr) command. As with the non-posted read operation, a completion operation (Cpl) is expected by the issuing entity. Thus, agent A issues the IOWr or CfgWr operation, along with the address of agent B to which the write is to be made. This is an example of a non-posted write transaction taking place between agents A and B.

Finally, a posted write transaction, or memory write (MWr) operation, may take place between agents A and B. In this case, agent A issues the MWr, along with the address of agent B to which the write is to be made. In contrast to the non-posted operations, however, there is no completion operation expected by agent A from agent B. Instead, Agent A assumes the operation was successful.

The completion combining apparatus 100 is concerned only with the non-posted transactions and their corresponding completions. One characteristic of all non-posted transactions is that the requestor of the transaction (e.g., agent A in FIG. 3) is identified in the RID 22 of the header 60 of each packet (FIG. 1). Thus, in some embodiments, the collection engine 30, while monitoring the flow of packets 20 from the FIFO 50 to the packet processing, is able to identify the requestor of each packet.

Besides knowing the requestor of the packet 20, the completion combining apparatus 100 also monitors the completion status field 26, in some embodiments. The completion status field 26 tells the completion combining apparatus 100 whether the transaction that was initiated was successful. In addition to success, in some embodiments, the completion status field 26 denotes different failure statuses, whether a retry occurred, whether a retry should be attempted, and so on. There are many reasons why a transaction might not succeed. Attempting a read operation from an invalid memory address is one example. In some embodiments, the completion combining apparatus 100 does not perform completion combining of non-posted transactions that are unsuccessful.

Also shown in FIG. 1 is a maximum payload size 24. For each link, the maximum payload size 24 is a statically defined entity that software programs before letting general transactions flow between two devices communicating between one another on the link. The software reads the maximum payload size defined for each device, which is obtained from configuration registers, in some embodiments, and programs the lower of the two numbers as the maximum payload size for that link. Thus, before the completion combining can take place, the maximum payload size 24 is obtained for that link, in some embodiments.

Thus, in some embodiments, the collection engine 30 of the completion combining apparatus 100 monitors the three fields 22, 24, and 26 before diverting a packet 20 for further processing. In FIG. 1, the three fields 22, 24, and 26 of each packet 20 are color-coded to illustrate the processing of the collection engine 30. Packets 20 that meet the criteria are extracted from the path and sent to the combining engine 40. In the illustration, packets 20 whos first two fields are red and green are targeted by the collection engine 30 to be diverted from the regular flow of packet processing.

At the combining engine 40, the completion combining apparatus 100 now has a collection of packets 20 that share common characteristics: they are all intended for the same requestor and they are successful completion packets. In some embodiments, the combining engine 40 extracts the header 60 from each of the collection of packets and calculates a new header 45, based on the new packet size. The new packet 80 is now ready to return to the regular flow of packet processing.

In some embodiments, the decompression 100B is designed to restore the packets 20 to their original configuration before being received at the requestor. In some embodiments, the completion-combined packet 80 is identified at the decompression 100B by a predefined bit in the header 45. In other embodiments, the completion-combined packet 80 is identified by comparing its size to the contents of an outstanding request queue 150, as explained further below. The header subtract engine 110 receives the new packet 80 and removes the header 45, such that only a headerless packet 140 remains.

In FIG. 2, the headerless packet 140 is shown having five parts, A, B, C, D, and E. Although these parts look identical to one another, they are not necessarily the same size. Thus, the packet 140 may be a 256-byte packet in which part A is 32 bytes, part B is 64 bytes, part C is 128 bytes, part D is 16 bytes, and part E is 16 bytes, as one possibility.

On the decompression side 100B, the completion combining apparatus has at its disposal an outstanding request queue 150 in which is stored all non-posted requests of the requestor. The outstanding request queue 150 helps the requestor keep track of the non-posted requests made. Because the packets A, B, C, D, and E making up the combined headerless packet 140 may not be stored in the order of transmission, the outstanding request queue 150 facilitates the proper extraction of the packets from the headerless packet 140. Further, in some embodiments, the outstanding request queue 150 helps the decompression side 100B to identify the compressed packet 80 as it flows through the link.

As shown in FIG. 2, the matching engine 120 associates portions of the headerless packet 140 based on the outstanding request queue 150, matches according to size, and the header add engine 130 adds a new header 160 to each matched packet, resulting in packets 170A, 170B, 170C, and so on (collectively, "packets 170"). By design, the packets 170 are substantially similar to the original packets 20, in some embodiments.

The completion combining apparatus 100 can be implemented in each direction of the link independently. For example, the apparatus 100 may be implemented only for outbound completions (e.g., completions from a root complex to an end point), only for inbound completions, or for both outbound and inbound completions.

In some embodiments, the completion combining apparatus 100 enables the completor of the completion transactions to combine multiple completions going to the requestor. Similarly, an intermediate component, such as a switch, can combine multiple completions going to the requestor. Whether by the completor or the intermediate switch, the apparatus 100 can be implemented by following a few rules.

For example, in some embodiments, multiple 32B or 64B completions going to the same requestor (as determined by the same bus, device, function) can be combined into a 256B completion payload, as long as the maximum payload size 24 is 256B or larger for each device on the link. Such combining improves the packet efficiency significantly, in some embodiments.

Figure 4:
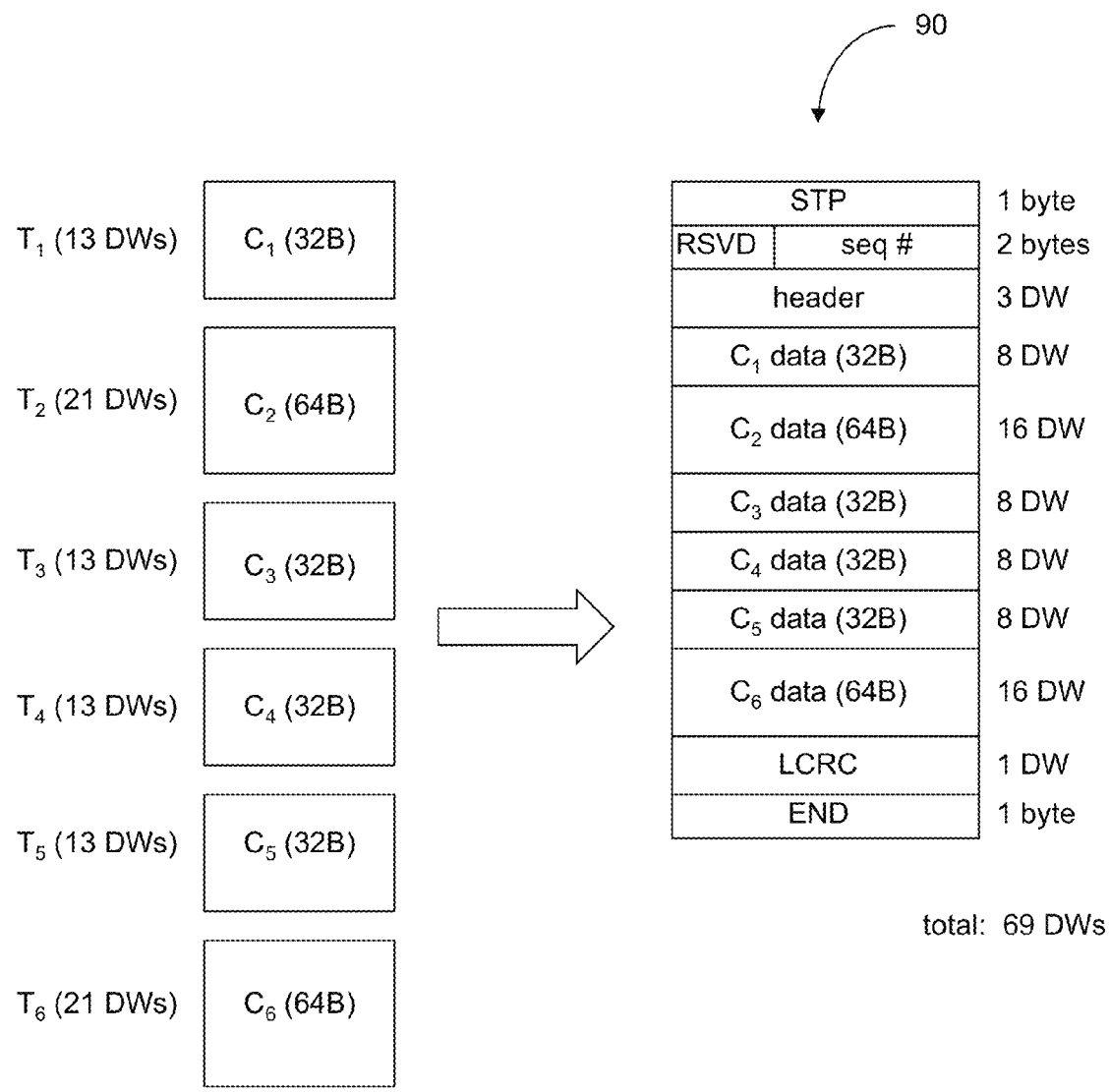
FIG. 4 is a block diagram featuring transactions and their completions to demonstrate an efficiency obtained by combining completions, as performed by the completion combining apparatus of FIGS. 1 and 2, according to some embodiments.

FIG. 4 visually demonstrates motivation for the completion combining apparatus 100 according to some embodiments. FIG. 4 shows how multiple small completions are combined to the same requestor in PCIe to form one aggregated completion. Transaction $T_1$, consisting of 13 DWs, would normally be transmitted as a 32B completion (C0. Transaction $T_2$, consisting of 21 DWs, would be transmitted as a 64B transaction ($C_2$). Transactions $T_3$, $T_4$, and $T_5$ are also 13 DWs, resulting in a 32B completions ($C_4$, $C_5$, and $C_6$). Like transaction $T_2$, transaction $T_6$, a 21 DW transaction, would result in a 64B completion ($C_6$).

These transactions and their completions are illustrated on the left side of FIG. 4. The total number of DWs shown to the left of the completions includes the 5 DWs of overhead for each completion. Thus, for the first transaction, T1, although the transaction itself takes eight DWs (32B), with the additional five DWs of overhead, the total number of DWs is thirteen. This overhead is added to each completion operation on the left side of FIG. 4.

An aggregated completion 90 is illustrated on the right side of FIG. 4. The aggregated completion 90 similarly has five DWs of overhead, namely one byte to indicate the start of the transaction packet (STP), two bytes for the sequence number (as well as reserved bits, RSVD, if needed), three DWs for the header, one DW for the transaction cyclic redundancy check (CRC), and one byte to indicate the end of the aggregate completion.

Despite the overhead, the aggregated completion 90 utilizes fewer bytes than the separate completion transactions, 69 DWs versus 94 DWs. Utilizing the aggregated completion 90, in this example, thus results in a gain of efficiency.

In some embodiments, using the completion combining apparatus 100, the completion combining is done if supported by both the entity performing the combining and the requestor of the transactions. This can be enabled by software by looking at the advertised capability and enabling the completion combining apparatus 100 if both ends support the feature. The completion combining apparatus 100 can also be enabled by devices exchanging vendor-defined messages in hardware. One approach would be to use continuous tag fields for requests and combining successful completions if all the completions are to the same requestor (e.g. same bus, device, function) and if they have consecutive tags. The requestor knows which tags are being completed by looking at the length field.

An alternative approach would be to allow combining of any successful completions going to the same requestor, but adding the tag fields of each of the completions. This will allow completion combining if the requests are serviced out of order in the system. This can be accomplished by using some of the reserved bit positions or some less important bit fields. For example, in the case of PCIe, the bits used for Requestor ID and BCM fields can be used for the additional tag to get an additional 28 bits. In either approach, the proposed completion combining 100 can be used through legacy switches, as the transaction format remains unchanged. The completion combining apparatus 100 can also be used with any other header compression scheme, such as one in which the full header is not sent.

Figure 5A:
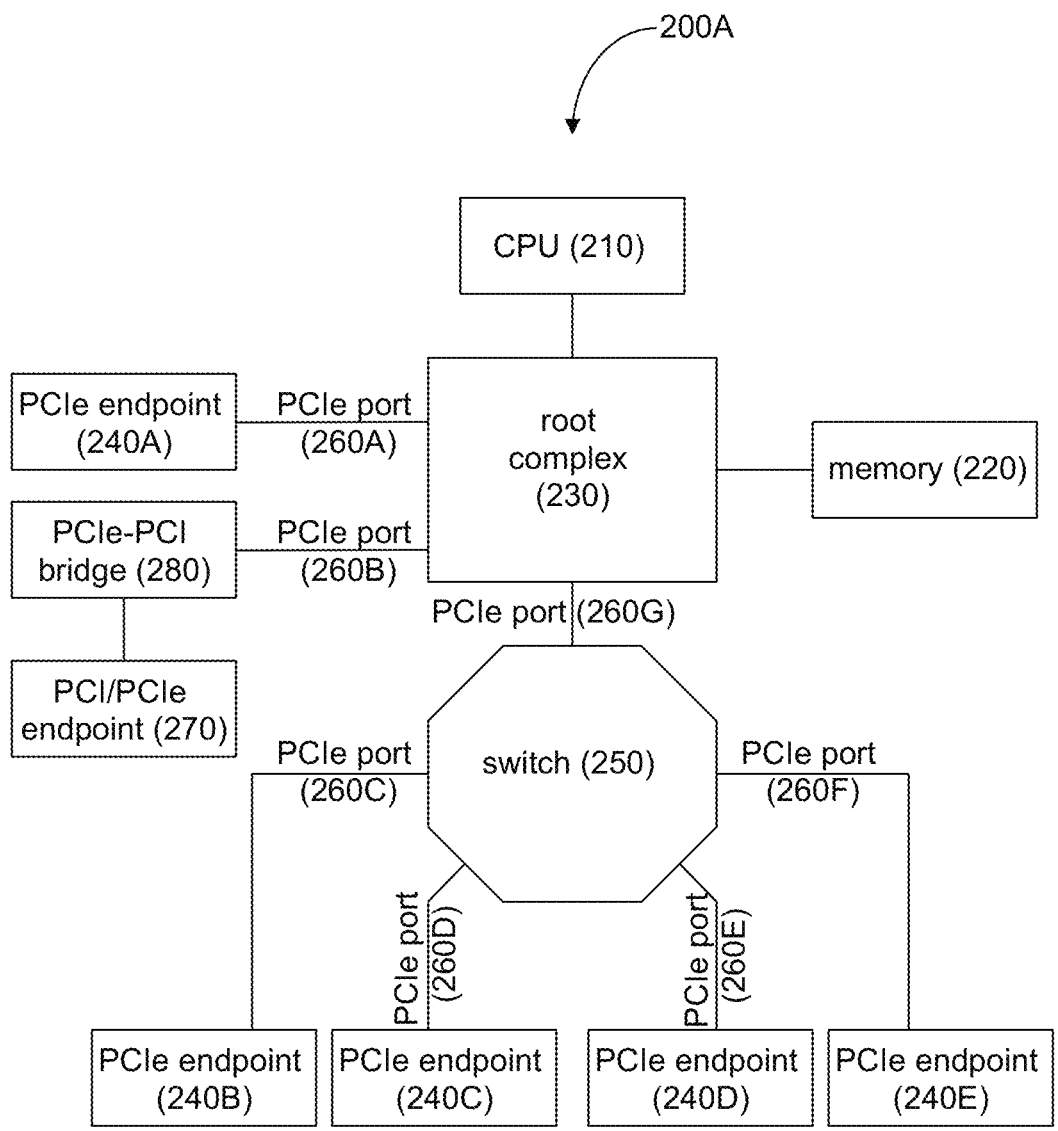
FIGS. 5A-5C are simplified diagrams of an example PCIe topology, used to demonstrate two possible implementations of the completion combining apparatus of FIGS. 1 and 2, according to some embodiments.
Figure 5B:
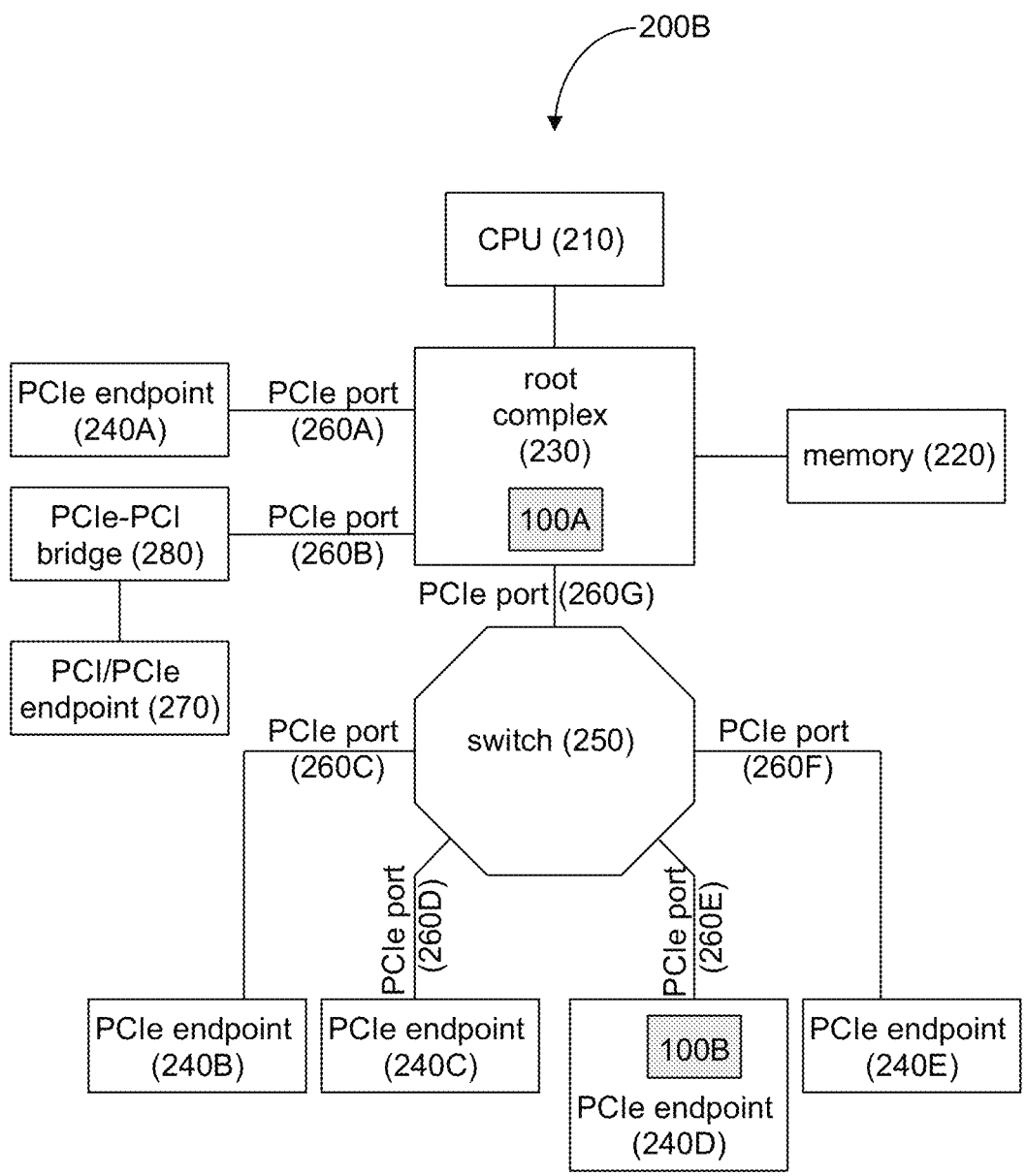
Figure 5C:
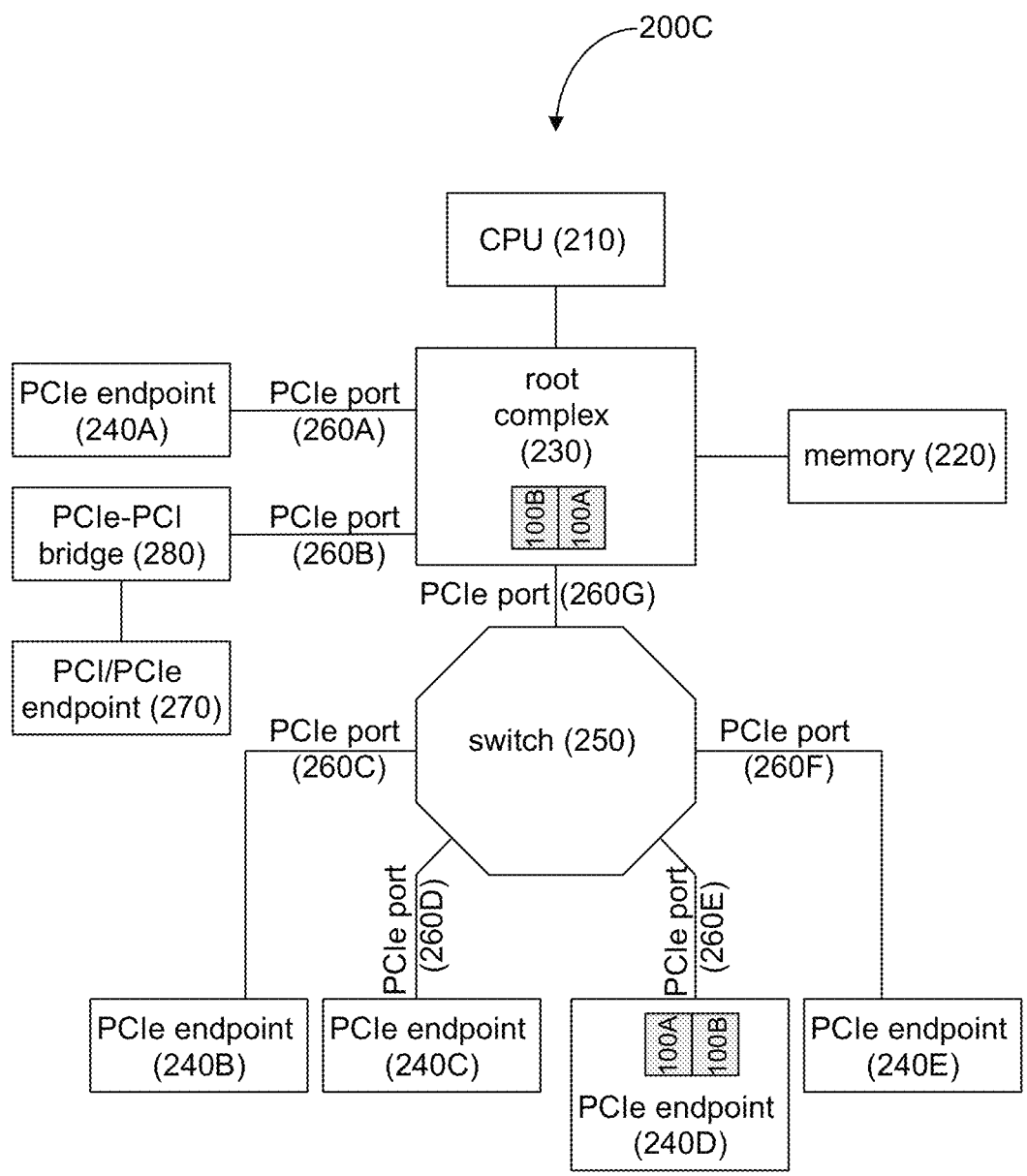

FIGS. 5A-5C are simplified block diagrams of an example PCIe system topology 200A, 200B, and 200C. The system 200A is shown without the completion combining apparatus 100, while the systems 200B and 200C show two different embodiments using the completion combining apparatus 100. In the system 200A, a root complex 230 is the root of a hierarchy that connects the CPU 210 and memory 220 to the connected I/O devices. The root complex 230 supports one or more PCI express ports connected to PCIe endpoints. PCIe ports 260A-260G (collectively, "PCIe ports 260") connect PCIe endpoints 240A-240E (collectively, "PCIe endpoints 240"), as well as a switch 250 and a PCIe-PCI bridge 280. PCIe topology may be as simple as a single endpoint or may, as in FIG. 5A, include a switch connecting multiple endpoints. The PCIe bridge 280 provides a connection between a PCI express fabric and a PCI/PCI-X hierarchy.

The completion combining apparatus 100 may reside in one of several different locations in the PCIe system topology 200. For example, the apparatus 100 may be in the switch, in the root complex, or in one of the endpoints. Further, the apparatus 100 may reside in the transaction layer or in the link layer. System designers of ordinarily skill in the art will recognize a number of different applications for the completion combining apparatus 100.

FIGS. 5B and 5C feature the completion combining apparatus 100 disposed in the root complex 230 and the PCIe endpoint 240D. In FIG. 5B, the compression portion 100A is in the root complex 230 while the decompression portion 100B is in the PCIe endpoint 240D. Thus, transactions flowing from the root complex 230 to the PCIe endpoint 240D will be compressed before entering the link, then decompressed after leaving the link, with the link in this example being made up of the path leaving the PCIe port 260G and entering the switch 250, then leaving the switch 250 via PCIe port 260E, then entering the PCIe endpoint 240D. The system 200B thus demonstrates one-way completion combining, or outbound completion combining. The switch 250 need not be aware of the completion combining operation, in some embodiments, as the packet passing through the switch conforms to the requirements of the system 200B, namely, the packet does not exceed the maximum payload size 24, as described above.

The system 200C in FIG. 5C is a little different from the system 200B in FIG. 5B. This time, the compression portion 100A and decompression portion 100B are found in both the root complex 230 and in the PCIe endpoint 240D. Thus, transactions flowing from the root complex 230 to the PCIe endpoint 240D will be compressed, will pass through the switch 250, and will be received into the PCIe endpoint 240D, then will be decompressed. Likewise, transactions flowing from the PCIe endpoint 240D will be compressed, will pass through the switch 250, and will be received into the root complex 230 and decompressed. The system 200C thus demonstrates two-way completion combining or both outbound and inbound completion combining.

Figure 6:
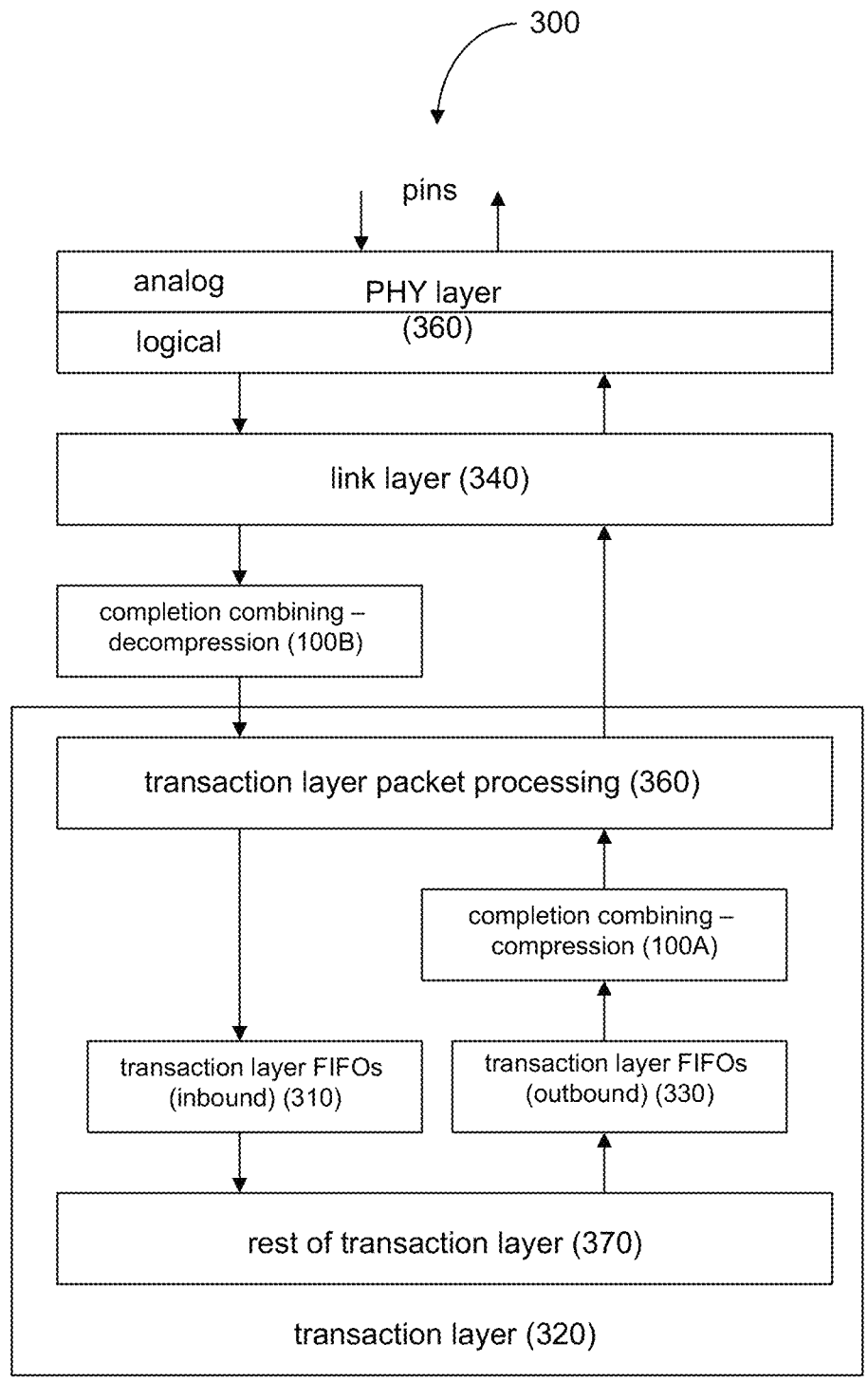
FIG. 6 is a simplified diagram of the logic layers under PCIe, used to demonstrate a possible arrangement of the completion combining apparatus of FIGS. 1 and 2, according to some embodiments.

FIG. 6 is a simplified diagram of the logic layers 300 under PCIe. The architecture is divided into three distinct layers, the transaction layer 320, the data link layer 340, and the physical layer 360. PCI express uses packets to communicate information between different components. Packets are formed in the transaction 320 and data link layers 340 to carry information from the transmitting component to the receiving component. While flowing through the layers, the packets get extended with additional information to facilitate transmission between the layers. At the receiving end, the process is reversed, and the packets get transformed from their physical layer representation to the data link layer representation and, finally, to the original transaction layer packets (TLPs) tha can be processed by the transaction layer of the receiving device.

In FIG. 6, the compression side completion combining 100A (FIG. 1) takes place in the transaction layer 320 under PCIe, according to some embodiments. The transmit side completion combining logic looks at a completion header, pulls ahead the next header from the FIFO 50, and checks whether the next transaction can be combined, as described above. This process is repeated until the combining conditions are met. The transmit side then starts transmitting the combined completion packet.

On the receiving side, the receiver unrolls the completions and delivers them to the receiving queues as individual completions. Alternatively, this functionality can be done in other parts, such as after the transaction layer queues.

The illustration in FIG. 6 shows the completion combining 100 taking place in the transaction layer. However, the completion combining may also take place in the link layer. As FIGS. 5B, 5C, and 6 illustrate, the completion combining 100 is highly flexible and may be useful for a wide variety of link conditions, where optimization of the link traffic is desired.

Figure 7:
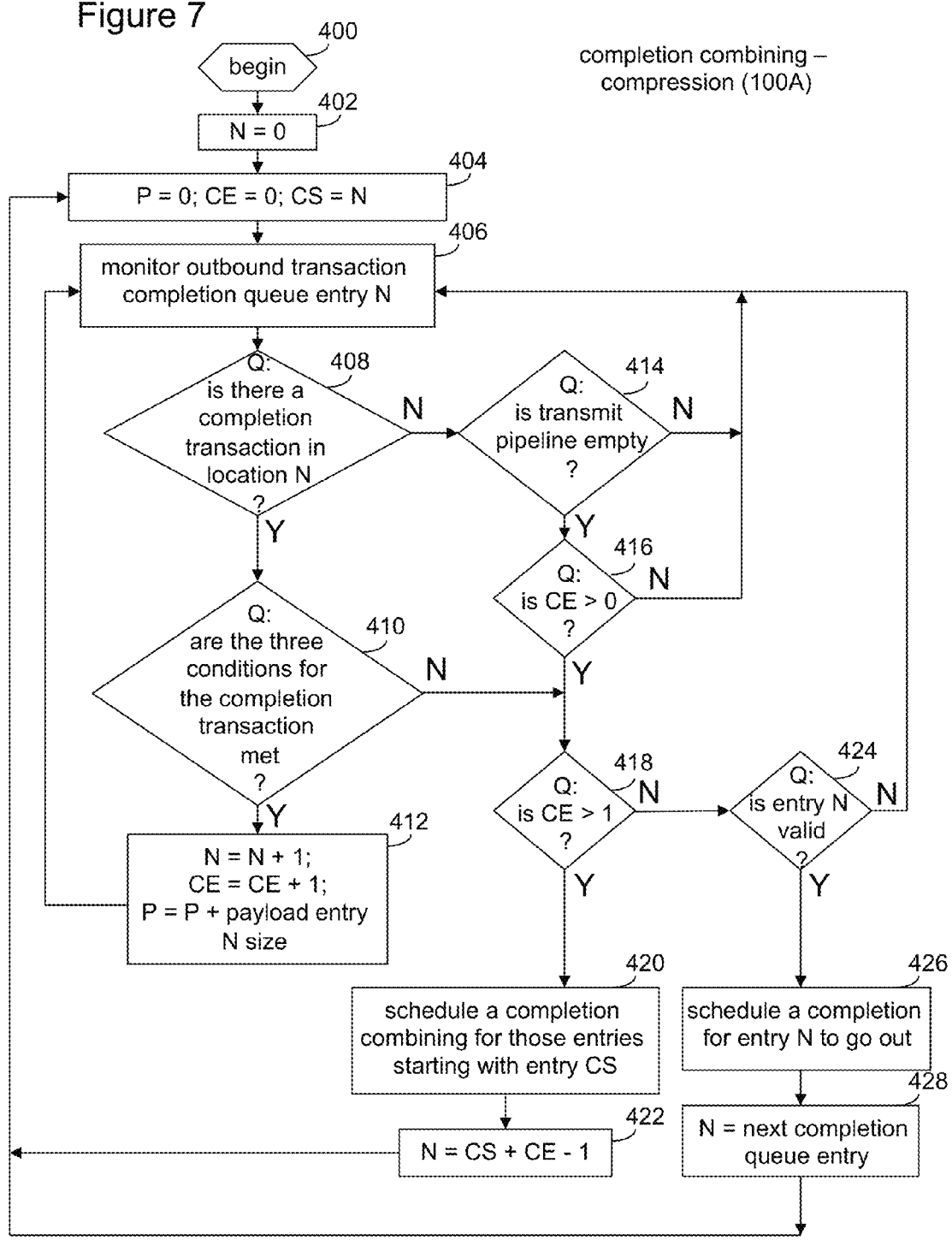
FIG. 7 is a flow diagram featuring operations performed by the compression portion of the completion combining apparatus of FIG. 1, according to some embodiments.
Figure 8:
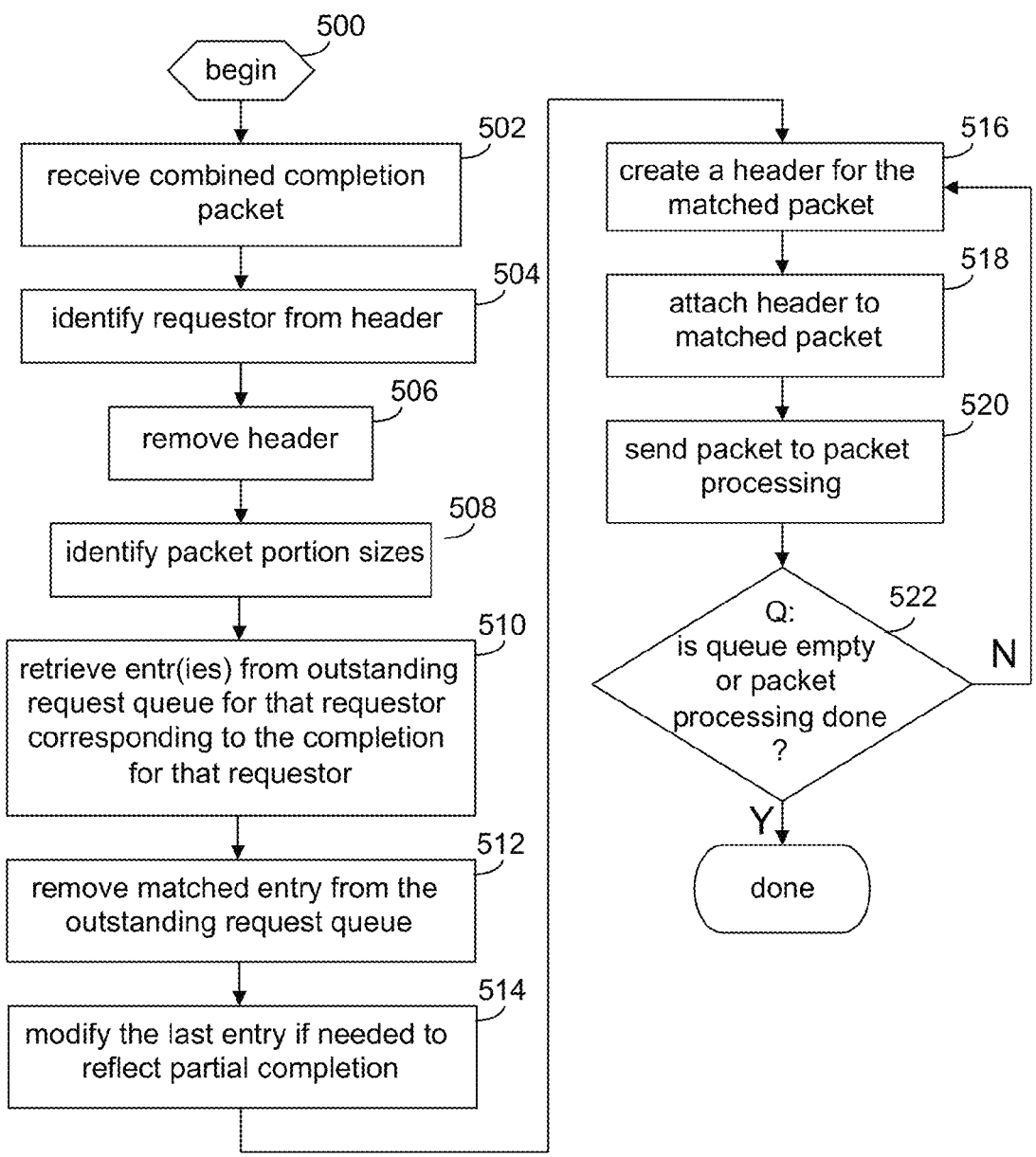
FIG. 8 is a flow diagram featuring operations performed by the decompression portion of the completion combining apparatus of FIG. 2, according to some embodiments.

FIGS. 7 and 8 are flow diagrams illustrating the steps taken by the completion combining apparatus 100, according to some embodiments, with FIG. 7 showing the compression side 100A and FIG. 8 showing the decompression side 100B. These operations may be performed in the transaction layer, as illustrated in FIG. 6, or in the link layer. Further, the transactions may be performed at the initiation of packet processing, whether in a switch, a hub, or an endpoint.

In performing the completion operations, the apparatus 100A initializes certain variables used to manage the monitoring of the FIFO (FIFO 50 in FIG. 1 or FIFO 330 in FIG. 6) or other transaction storage queue. In some embodiments, the storage queue is a circular storage structure of a predetermined size. The value, N, is used to keep track of where in the FIFO monitoring is taking place. Once the last entry in the FIFO is viewed, the monitoring begins back at the top of the FIFO. N may be initialized to zero, but N can be any value smaller than the size of the FIFO. So, for a FIFO of size 256, N can be any value from 0 to 255. For simplicity, N is initialized to 0 (block 402).

P, the payload size, is also initialized to zero. Recall that the size of the compressed packet cannot exceed the maximum payload size (MPS) 24, so the compression operation 100A tracks this value, in some embodiments, as new packets satisfying the criteria are amassed. A third variable, CE, short for combine entries, is the actual number of packets being combined. So, CE is the number of packets making up the grouped packets, P is the size of the grouped packets. A fourth variable, combine start, CS, indicates the starting location of the packets being grouped. CS is initialized to N (block 404).

The compression apparatus 100A thus beings monitoring the outbound transaction completion queue entry N (block 406). Where no completion transaction in location N is found (block 408), a query is made whether the transmit pipeline is empty (block 414). If the transmit pipeline is not empty, then there is really no point in sending a combined packet to the pipeline, and the process is restarted (block 406) until a completion transaction is found at location N (block 408). If, instead, the transmit pipeline is empty and thus available to receive a transaction, then, if there are no combine entries (block 416) then there is nothing to send to the transmit pipeline. Thus, the process is restarted (block 406).

If, instead, there is at least one completion entry, then a query is made whether there are at least two completion entries (block 418). If so, then a completion combining operation is scheduled, starting with the entry at the completion start point (block 420). The variable, N, is updated to include the completion start point plus the completion entry point, minus one (as the count is zero-based), and the process begins again (block 406).

Otherwise, there are not at least two completion entries and a query is made whether the entry at location N is valid (block 424). If so, a completion is scheduled for entry N to go out (block 426) and N is updated to the next completion queue entry (block 428). Otherwise, the entry at location N is not valid (block 424). In either case, the process is repeated (block 406).

Returning to the completion transaction query (block 408), if, instead, there is a completion transaction in location N, recall that there are three criteria that must be satisfied before a group of packets will be compressed: common requestor, completion is deemed successful, and size of grouped packets does not exceed the maximum payload size 24 (FIG. 1). Accordingly, where the three criteria are met (block 410), this means there is a suitable completion transaction in the queue, and the variables, N, CE and P are updated. the first two variables, N, and CE, are incremented, while the payload size, P, is updated to include the size of the most recently identified completion transaction.

Where the three conditions are not met, the operations described above where the number of completion entries exceeds one (block 418) are performed.

The steps taken by the decompression portion 100B of the compression apparatus 100 are illustrated in FIG. 8, according to some embodiments. The combined completion packet 80 is received (block 502), with the header 45 indicating the requestor of the packet (block 504). The header 45 is then removed (block 506), and the packet portion sizes identified (block 508). As described above, the packet portions (A-E in FIG. 2) may have different sizes. These sizes are compared to the outstanding request queue 150, which indicates all pending non-posted transactions initiated by the requestor (block 510). The queue 150 entries are matched to the packet portion sizes, with the matched entry being removed from the queue once a match is made (block 512). If needed, the last entry of the outstanding request queue 150 is modified to reflect a partial completion (block 514). A header is created for the matched packet (block 516), attached to the packet (block 518) and the new packet 170 is sent downstream for further processing (block 520). These last operations are continued until either the outstanding request queue is empty or the received packet 140 is processed (block 522).

Figure 9:
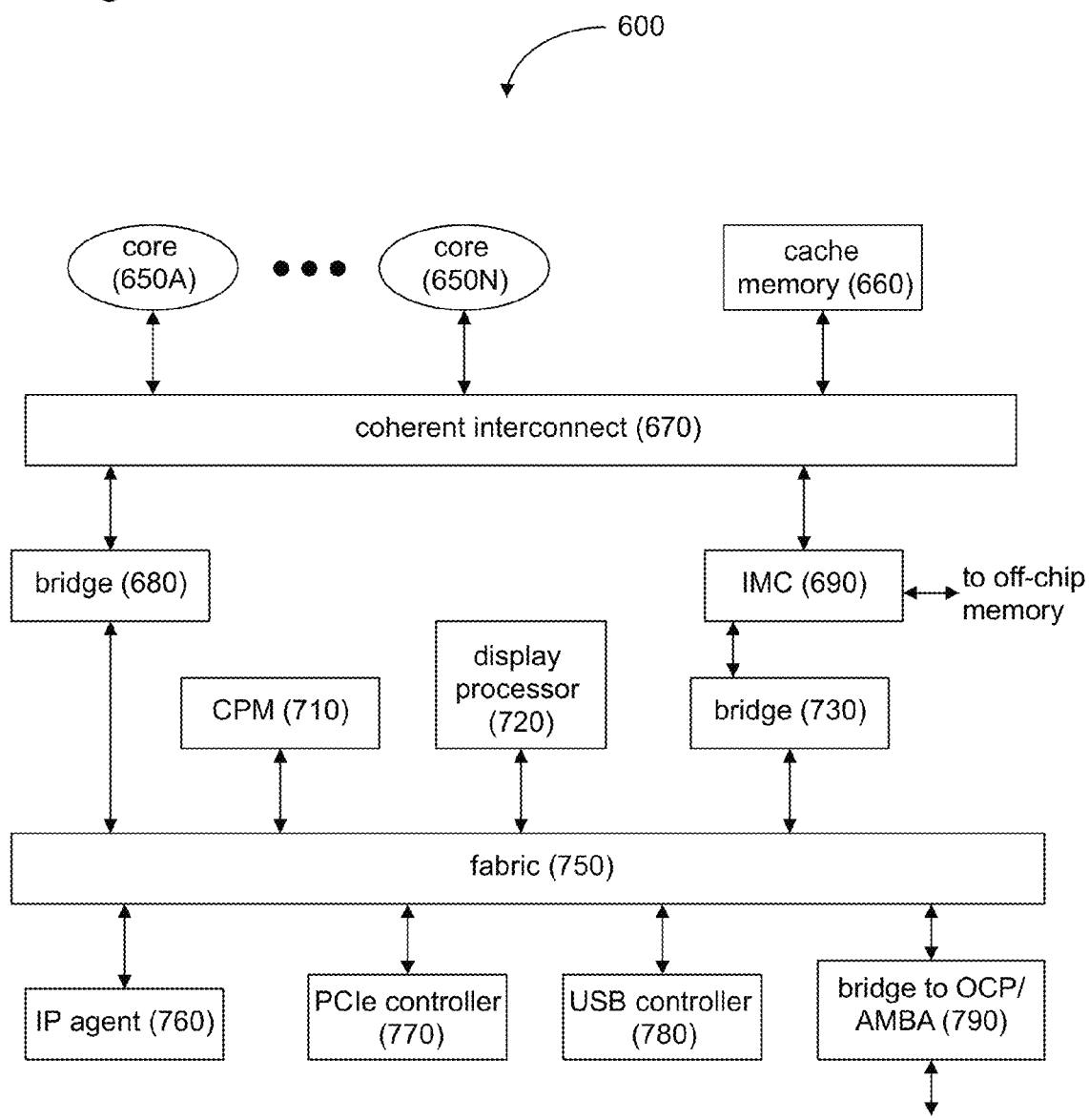
FIG. 9 is a high-level block diagram of a system-on-chip, which may support the completion combining apparatus of FIGS. 1 and 2, according to some embodiments.

Referring now to FIG. 9, shown is a high-level block diagram of a system-on-chip (SoC), according to some embodiments. The SoC 600 includes various components, all of which can be integrated on a single semiconductor die to provide for various processing capabilities at high speeds and low power, consuming a comparatively small amount of real estate.

The SoC 600 includes a plurality of cores 650A-650N (collectively, "cores 650"). In various embodiments, the cores 650 can be relatively simple in-order cores or more complex out-of-order cores. Or a combination of in-order and out-of-order cores can be present in a single SoC. As seen, cores 650 can be interconnected via a coherent interconnect 670, which further couples to a cache memory 660, such as, for example, a shared last level cache (LLC). Although the scope of the present disclosure is not limited in this regard, in one embodiment, coherent interconnect 670 is designed in accordance with the Quick Path Interconnect (QPI)™ specification. (The QPI™ is a product of Intel Corporation of Santa Clara, Calif.).

As further seen in FIG. 9, coherent interconnect 670 may communicate via a bridge 680 to a fabric 750, which may be an integrated on-chip system fabric (IOSF). Coherent interconnect 670 may further communicate via an integrated memory controller (IMC) 690 to an off-chip memory (not shown), and further through a bridge 730 to the fabric 750.

As further seen in FIG. 9, various components can couple to the fabric 750, including a content processing module (CPM) 710, which can be used for performing various operations such as security processing, cryptographic functions, and so forth. In addition, a display processor 720 can be part of a media processing pipeline that renders video for an associated display (not shown).

The fabric 750 may further couple to an IP agent 760. Although only a single agent is shown for ease of illustration in the embodiment of FIG. 9, understand that multiple such agents are possible in different embodiments. In addition, to enable communication with other on-chip devices, the fabric 750 may further communicate with a PCIe™ controller 770 and a universal serial bus (USB) controller 780, both of which can communicate with various devices according to these protocols.

Finally, the SoC 600 of FIG. 9 features a bridge 790, which can be used to communicate with additional components of other protocols, such as an open core protocol (OCP) or an ARM advanced microcontroller bus architecture (AMBA) protocol.

While shown as a single die SoC implementation in FIG. 9, embodiments can further be implemented in a system in which multiple chips communicate with each other via a non-IOSF interface. Further, the scope of the present disclosure is not limited to the particular component illustration of FIG. 9, as additional or different components may be present in different embodiments. The completion combining apparatus 100 may be operable in the SoC 600 in order to optimize transmission between components therein.

The completion combining apparatus 100 may be part of a PCIe link, as illustrated in FIGS. 5B and 5C, above, but is not limited in this regard. Virtually any link between two entities may be a candidate for the completion combining apparatus 100. Thus, the USB controller 780 (FIG. 9) may include a completion combining apparatus 100 for downstream USB links. Or the coherent interconnect 670 operating under the QPI standard may feature the completion combining apparatus 100 to optimize transmissions between devices on the interconnect. Transmissions between agents on a bus may constitute a link. The completion combining apparatus 100 may be one-way (FIG. 5B) or two-way (FIG. 5C). System designers of ordinary skill will recognize a number of different implementation regimes, depending on system requirements, cost considerations, and other factors.

The benefit of the completion combining apparatus 100 is the improvement of the bandwidth utilization of the link. Table 1 demonstrates the benefit of completion combining for multiple requests from the same requestor for PCIe. Completion combining of the smaller requests result in a larger impact, and more combined payload results in greater efficiency improvement.

TABLE 1

Efficiency improvement using method 100

| payload size | efficiency | % improvement if 256 B payload | % improvement if 512 B payload |
| --- | --- | --- | --- |
| 32 B | 61.54% | 50.71% | 56.39% |
| 64 B | 76.19% | 21.74% | 26.32% |
| 128 B | 86.49% | 7.24% | 11.27% |
| 256 B | 92.75% | N/A | 3.76% |
| 512 B | 96.24% | N/A | N/A |

While the application has been described with respect to a limited number of embodiments, those skilled in the art will appreciate numerous modifications and variations therefrom. It is intended that the appended claims cover all such modifications and variations as fall within the true spirit and scope of the invention.

I claim:

1. A system, comprising:
   a root complex to couple to a central processing unit and a memory;
   a switch to couple the root complex to a plurality of endpoints, wherein a transmission link is to be formed between the root complex and an endpoint of the plurality of endpoints;
   compression means to be disposed in the root complex, the compression means to:
     intercept a plurality of completion transaction packets intended for the endpoint, the completion transactions to be provided in response to non-posted transactions previously transmitted across the transmission link, wherein a non-posted transaction comprises a transaction under a peripheral component interconnect express (PCIe) high-speed serial bus standard which, when successful, is followed by a completion transaction;
     combine the plurality of completion transaction packets into a new completion transaction packet, the new completion packet to include a size not exceeding a maximum payload size of the transmission link;

generate a header to be coupled to the new completion packet, the header comprising a predetermined request identifier and a completion status indicator, wherein the header and the new completion packet do not exceed a predetermined maximum payload size; and transmit the new completion packet across the transmission link to the endpoint.

2. The system of claim 1, further comprising:
decompression means to be disposed in the endpoint, the decompression means to:
intercept the new completion packet;
remove a header to be added to the new completion packet by the compression means; and
recover the plurality of completion transaction packets.

3. The system of claim 2, further comprising:
a second compression means to be disposed in the endpoint, the second compression means to:
intercept a second plurality of completion transaction packets intended for the root complex;
combine the second plurality of completion transaction packets into a second new completion transaction packet, the second new completion packet to include a second size not exceeding the maximum payload size of the transmission link; and
transmit the second new completion packet across the transmission link to the root complex.

4. The system of claim 3, further comprising:
a second decompression means to be disposed in the root complex, the second decompression means to:
intercept the second new completion packet;
remove a second header added to the second new completion packet by the second compression means; and
recover the second plurality of completion transaction packets.

5. The system of claim 1, the endpoint to be the requestor.

6. The system of claim 3, the root complex to be the requestor.

7. A method comprising:
collecting a completion packet before transmission across a two-end link of a processor-based system, the completion packet comprising a successful response to a non-posted transaction transmitted by a requestor;
combining, at a first end of the two-end link, the collected completion packet with a second completion packet to form a combined completion packet, the second completion packet also comprising a successful response to a second non-posted transaction transmitted by the requestor, wherein the combined completion packet does not exceed a maximum payload size of either the first end or the second end of the two-end link;
adding a header to the combined completion packet to produce a new completion packet; and
transmitting the new completion packet across the two-end link;
wherein the new completion packet is to be disassembled at a second end of the two-end link into the completion packet and the second completion packet before being received by the requestor.

8. The method of claim 7, further comprising:
removing a second header from the completion packet;
removing a third header from the second completion packet;
wherein the second header and the third header are to be removed before the completion packet is to be combined with the second completion packet.

9. The method of claim 8, further comprising:
confirming that the completion packet and the second completion packet are to be successful completion operations.

10. The method of claim 9, further comprising:
confirming that the completion packet and the second completion packet are to be successful completion operations by viewing a predetermined field in the header of each completion packet.

11. The method of claim 7, further comprising:
confirming that a size of the completion packet summed with a second size of the second completion packet is not to exceed a predetermined maximum payload size of the two-end link before combining the completion packet with the second completion packet.

12. The method of claim 7, wherein the two-end link is to operate according to a Quick Path Interconnect (QPI)™ standard.

13. An article comprising a medium storing instructions which, when executed by a processor, cause a system to:
intercept a first completion transaction packet and a second completion transaction packet, the first and second completion transaction packets to be intended for a single endpoint, the first and second completion transactions comprising successful responses to two different non-posted transactions to have been previously transmitted across a transmission link;
combine the first and second completion transaction packets into a combined completion transaction packet, the combined completion packet to include a size not exceeding a maximum payload size of the transmission link;
add a header to the combined completion packet, to result in a new completion packet; and
transmit the new completion packet from a first point in the transmission link to a second point in the transmission link.

14. The article of claim 13, further storing instructions which, when executed by the processor, cause a system to:
remove a first header from the first completion transaction; and
remove a second header from the second completion transaction;
wherein the first and second headers are to be removed before the header is to be added to the combined completion packet.

15. The article of claim 14, further storing instructions which, when executed by the processor, cause a system to:
remove the header from the new completion packet at the second point in the transmission link, to result in the combined completion packet;
recover a first packet portion and a second packet portion from the combined completion packet;
add a third header to the first packet portion, to result in a third completion transaction, wherein the third completion transaction is to be substantially similar to the first completion transaction; and
add a fourth header to the second packet portion, to result in a fourth completion transaction, wherein the fourth completion transaction is to be substantially similar to the second completion transaction;
wherein the third completion transaction and the fourth completion transaction are to be transmitted to the requestor.

16. A method comprising:
collecting, by a completor, a completion packet before transmission across a two-end link of a processor-based system, the completion packet comprising a successful response to a non-posted transaction transmitted by a requestor to be received by the completor;

combining, by the completor, the collected completion packet with a second completion packet to form a combined completion packet, the second completion packet also comprising a successful response to a non-posted transaction transmitted by the requestor;

adding, by the completor, a header to the combined completion packet to produce a new completion packet; and transmitting, by the completor, the new completion packet across the two-end link;

wherein the new completion packet is to be disassembled at a second end of the two-end link into the completion packet and the second completion packet by the requestor.

17. The method of claim 16, further comprising:
removing, by the completor, a header from the completion packet;
removing, by the completor, a second header from the second completion packet;
wherein the header and the second header are to be removed before the completion packet is combined with the second completion packet.

18. The method of claim 17, further comprising:
confirming, by the completor, that the completion packet and the second completion packet are successful completion operations.

19. The method of claim 18, further comprising:
confirming, by the completor, that the completion packet and the second completion packet are successful completion operations by viewing a predetermined field in the header of each completion packet.

20. The method of claim 16, further comprising:
confirming, by the completor, that a size of the completion packet summed with a second size of the second completion packet does not exceed a predetermined maximum payload size of the two-end link before combining the completion packet with the second completion packet.

* * * * *